United States Patent
Boulanger et al.

(10) Patent No.: US 7,983,856 B2
(45) Date of Patent: Jul. 19, 2011

(54) FLOW METER

(75) Inventors: Michael P. Boulanger, Everett, WA (US); Bruce K. Grewell, Seattle, WA (US)

(73) Assignee: Eldec Corporation, Lynnwood, WA (US)

( * ) Notice: Subject to any disclaimer, the term of this patent is extended or adjusted under 35 U.S.C. 154(b) by 0 days.

(21) Appl. No.: 12/248,169

(22) Filed: Oct. 9, 2008

(65) Prior Publication Data
US 2009/0099794 A1    Apr. 16, 2009

Related U.S. Application Data

(60) Provisional application No. 60/979,476, filed on Oct. 12, 2007.

(51) Int. Cl.
G01F 1/34 (2006.01)
G01F 1/44 (2006.01)
G01F 1/42 (2006.01)

(52) U.S. Cl. ............... 702/47; 702/45; 702/46; 702/50; 702/52; 702/54; 702/55; 702/56; 73/579; 73/861.61; 73/861.63

(58) Field of Classification Search .............. 702/45–47, 702/50, 52, 54–56; 73/579, 861.61, 861.63
See application file for complete search history.

(56) References Cited

U.S. PATENT DOCUMENTS

| | | | |
|---|---|---|---|
| 3,176,222 A | 3/1965 | Atkisson | |
| 4,006,634 A | 2/1977 | Billette et al. | |
| 4,199,003 A | 4/1980 | Goldsmith | |
| 4,688,433 A | 8/1987 | Silverwater | |
| 4,829,831 A | 5/1989 | Kefer et al. | |
| 5,469,749 A | 11/1995 | Shimada et al. | |
| 5,979,247 A | 11/1999 | Kizawa | |
| 6,722,211 B1 * | 4/2004 | Ciobanu et al. | 73/861.52 |
| 6,892,745 B2 | 5/2005 | Benson | |
| 2002/0178803 A1 * | 12/2002 | Pelletier et al. | 73/152.47 |

FOREIGN PATENT DOCUMENTS

JP    200453325 A    2/2004

OTHER PUBLICATIONS http://www.engineeringtoolbox.com/flow-meters-d_493.html.*
Capano, Dan. "In Control" Density Measurement, Theory, and Practice, Jun. 2003. Retrieved from www.waterandwastewater.com—Ask Tom! Archive. pp. 1-4.*
International Search Report issued May 28, 2009, pp. 1-4.

* cited by examiner

*Primary Examiner* — Sujoy K Kundu
(74) *Attorney, Agent, or Firm* — Fulwider Patton LLP

(57) ABSTRACT

A simple, passive and rugged device for measuring the flow rate of liquid. A variable area obstruction valve, a differential pressure sensor and a densitometer are combined in a single housing to provide for a highly accurate and precise measure of mass flow.

9 Claims, 5 Drawing Sheets

FLOW METER

CROSS-REFERENCES TO RELATED APPLICATIONS

This application claims priority from U.S. Provisional Application No. 60/979,476, filed Oct. 12, 2007, incorporated by reference in its entirety.

BACKGROUND

The present invention is generally directed to flow meters and more particularly pertains to a mass flow meter. The device measures both volumetric flow as well as density to yield mass flow.

Aircraft engine and airframe designers seek highly accurate, wide flow range, fast response, and rugged flow meters to measure the flow rate of hydrocarbon based fuel (jet fuel) for the purposes of engine control. Heretofore used volumetric flow meters have a limited range and are incapable of providing the accuracy that can be exploited by modern engine control systems. What is needed is a simple, passive, accurate and reliable method of measuring mass flow.

SUMMARY OF THE INVENTION

The present invention provides a volumetric flow meter in combination with a densitometer to provide a mass flow measurement. The volumetric flow meter relies on an variable area obstruction meter to yield an extended turn-down ratio without active controlling mechanisms and a differential pressure sensor to measure the pressure difference across the obstruction. The densitometer relies on capacitance tubes to yield a density measurement of the fluid passing there through. A fuel temperature sensor serves to correct both the pressure bridge signal as well as the density signal to enable a highly accurate and precise mass flow computation to be performed.

These and other features of the present invention will become apparent from the following detailed description of the preferred embodiments which, taken in conjunction with the accompanying drawings, illustrate by way of example the principles of the invention.

DETAILED DESCRIPTION OF THE PREFERRED EMBODIMENTS

Figure 1:
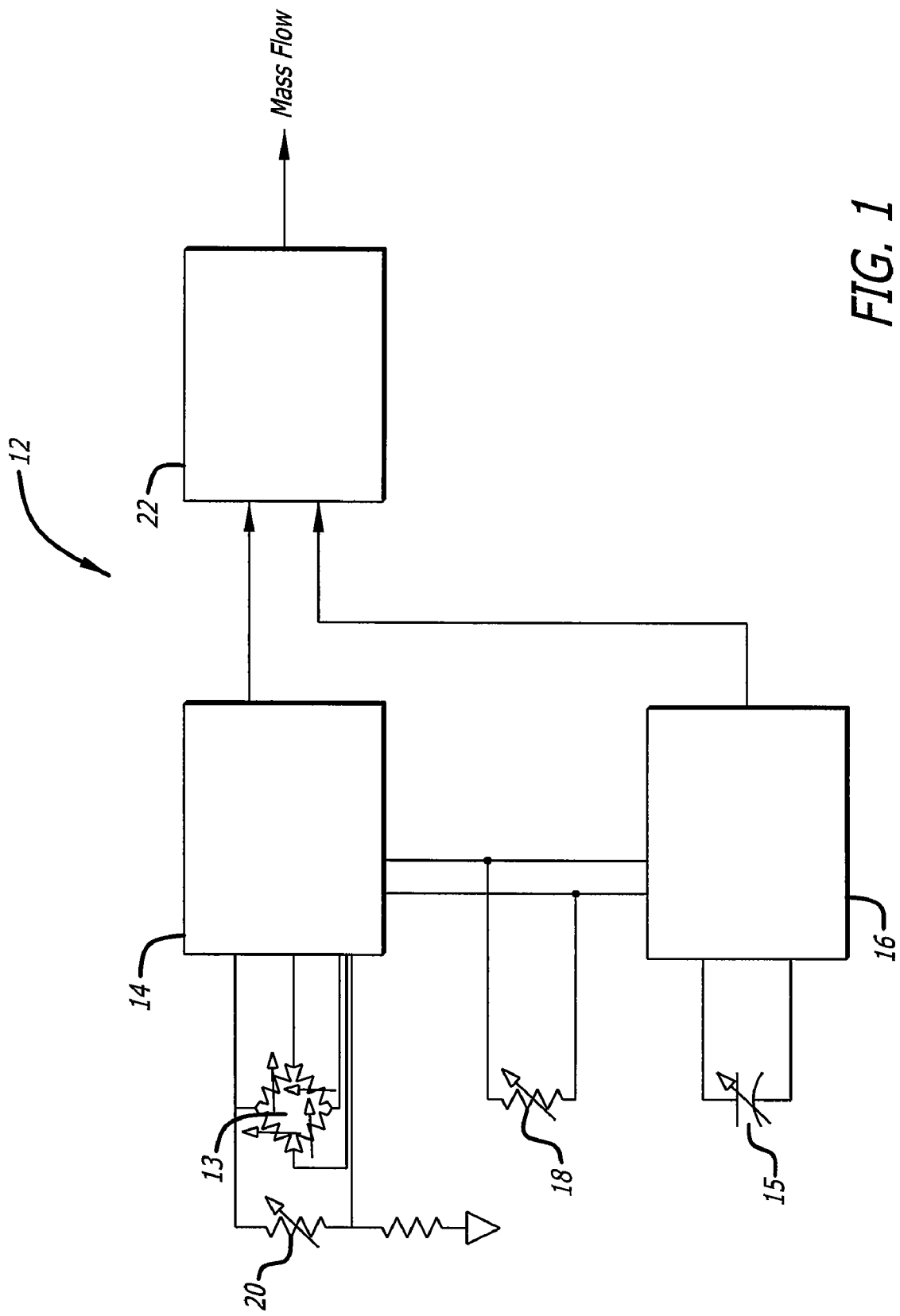
FIG. 1 is a block diagram generally illustrating the system of the present invention.

FIG. 1 is a block diagram providing an overall illustration of the system 12 of the present invention. The pressure differential across an obstruction positioned in the flow path of a liquid is measured via pressure bridge 13 and processed at 14 to yield a pressure signal which is proportional to volumetric flow rate while the capacitance of the flowing liquid is measured at 15 and processed at 16 to yield a density signal. The temperature of the liquid is measured at 18 and is used in the correction of both the pressure bridge signal as well as the densitometer signal. An additional correction 20 of the pressure bridge signal is made as a function of the temperature of the pressure differential sensor itself. The temperature sensor is integrated into the diaphragm of the sensor as the diaphragm temperature may be different than the liquid or environmental temperatures. The final computation of mass flow is made at 22.

Figure 2:
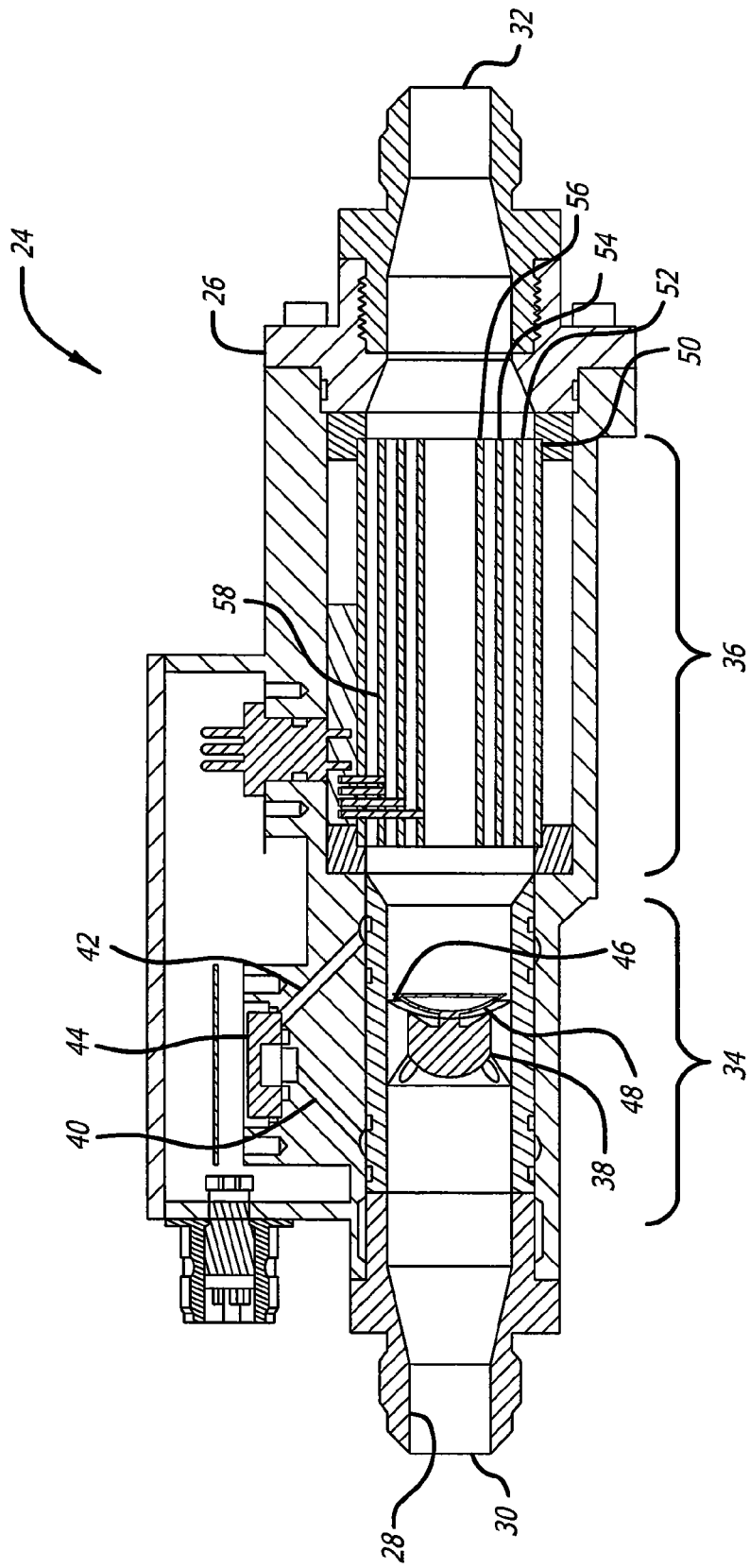
FIG. 2 is a cross-sectional view of a preferred embodiment of the flow meter of the present invention.

FIG. 2 is a cross-sectional view of a preferred embodiment of the flow meter 24 of present invention. The flow meter housing 26 has a lumen 28 defined therein that extends therethrough from its proximal end 30 to its distal end 32. The housing accommodates a volumetric flow meter 34 and a densitometer 36. The volumetric flow meter includes a variable area obstruction valve 38 that is positioned within the flow path. Pressure measurement passages 40, 42 extending from either side of the obstruction valve allow a differential pressure sensor 44 to measure the pressure drop across the obstruction. The area of the obstruction is variable to the extent that flexible petal valves 46 extending therefrom deflect as flow rate increases to thereby gradually decrease the area of obstruction and increase the flow area. The petal valve stiffness is selected to so as to accommodate the anticipated range of flow rates. The resulting reduced change in differential pressure over a given flow range allows the flow meter to be useful over a wider flow range. The variable venturi throat design is self regulating so its flow rate versus flow area relationship will be repeatable and therefore flow rate versus pressure drop is predictable. As a result, a rangeability of 30 to 1 is achievable and can readily accommodate for example, a flow range of 200 to 6000 pph. The obstruction valve additionally includes a support structure 48 that is disposed on its downstream side which serves to prevent the petal valves from creasing or taking a set and functions as a stop. By preventing the petal valves from being damaged both the repeatability of flow measurement is enhanced and service life is extended.

The densitometer 36 consists of a capacitance probe in the form of a set of concentric tubes 50, 52, 54, 56 through which the fuel flows. The dielectric constant of the fuel is measured as it passes through the tubes. Since the fuel density can be correlated to the dielectric constant, it can be used as a density sensor when the signal is corrected by fuel temperature. The fuel temperature measurement is achieved by bonding a film temperature sensor 58 to the densitometer surface. This temperature signal is used to correct the density reading and the mass flow computation which is dependent on fuel properties, which vary predictably with temperature. Since the fuel type is a variable but known to be within limits, the fuel density is a random variable within known limits. The density sensor allows a significant reduction of system error due to this random variable, since it is related directly to the mass flow measurement error. The product of the volumetric flow rate and the density, corrected by fuel temperature, allows for a precise mass flow measurement.

Figure 3:
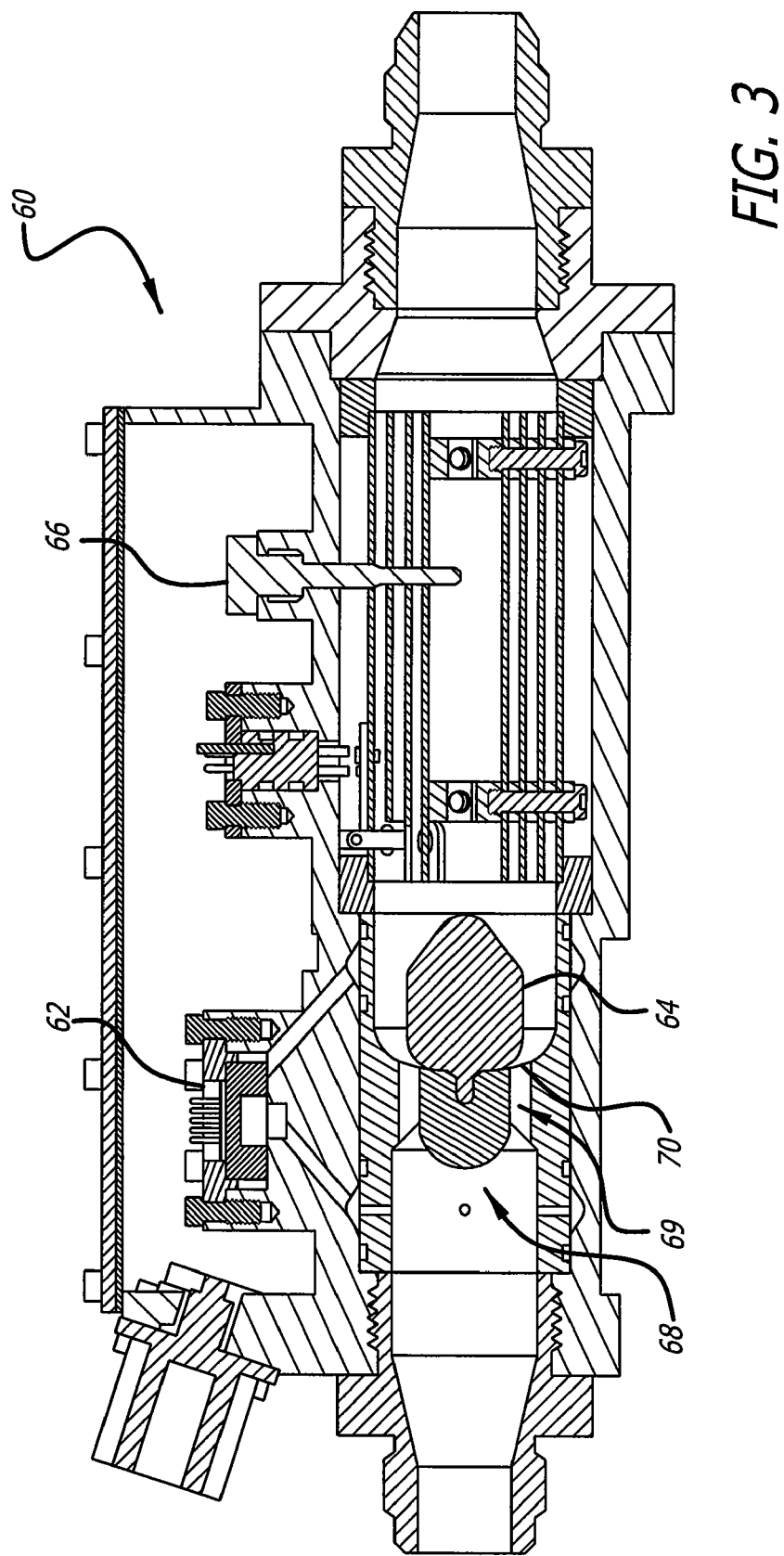
FIG. 3 is a cross-sectional view of another preferred embodiment.

FIG. 3 is a cross-sectional view of another preferred embodiment of a flow meter 60 of the present invention for measuring flow through orifice 69. Some of the modifications included the incorporation of a temperature sensor 62 within the pressure differential sensor, the incorporation of an orifice valve regulator 64 to serve as a petal valve support structure and the location of a low thermal mass temperature probe 66 within the fuel stream. The orifice valve regulator serves to vary the valve length and stiffness as the valve deflects open. The regulator thereby controls the orifice effective area as a function of fluid flow rate. Such feature also prevents excessive deflection that would result in valve deformation.

Figure 4:
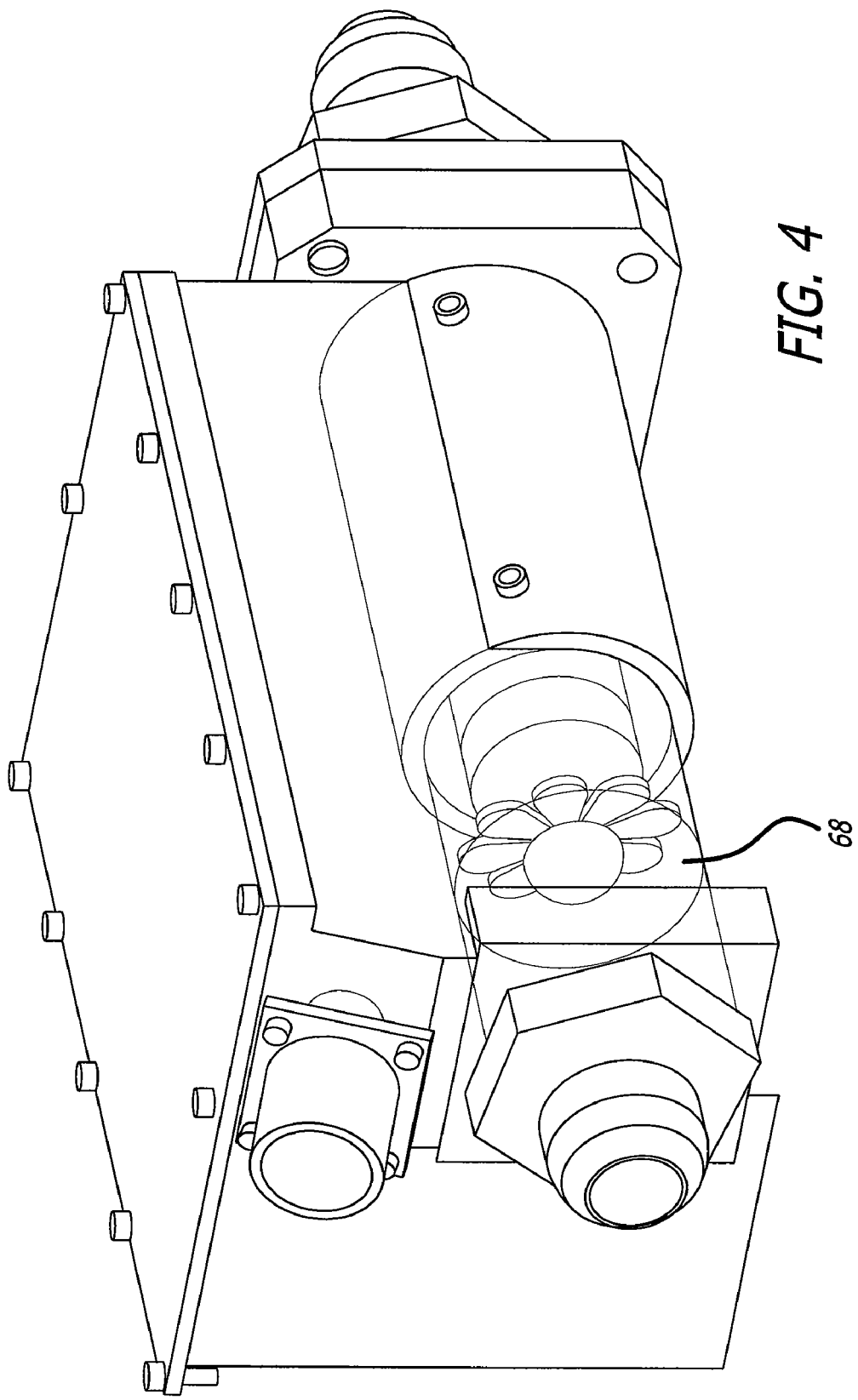
FIG. 4 is a perspective view of the embodiment shown in FIG. 3.

FIG. 4 is a perspective view of the flow meter shown in FIG. 3.

Figure 5:
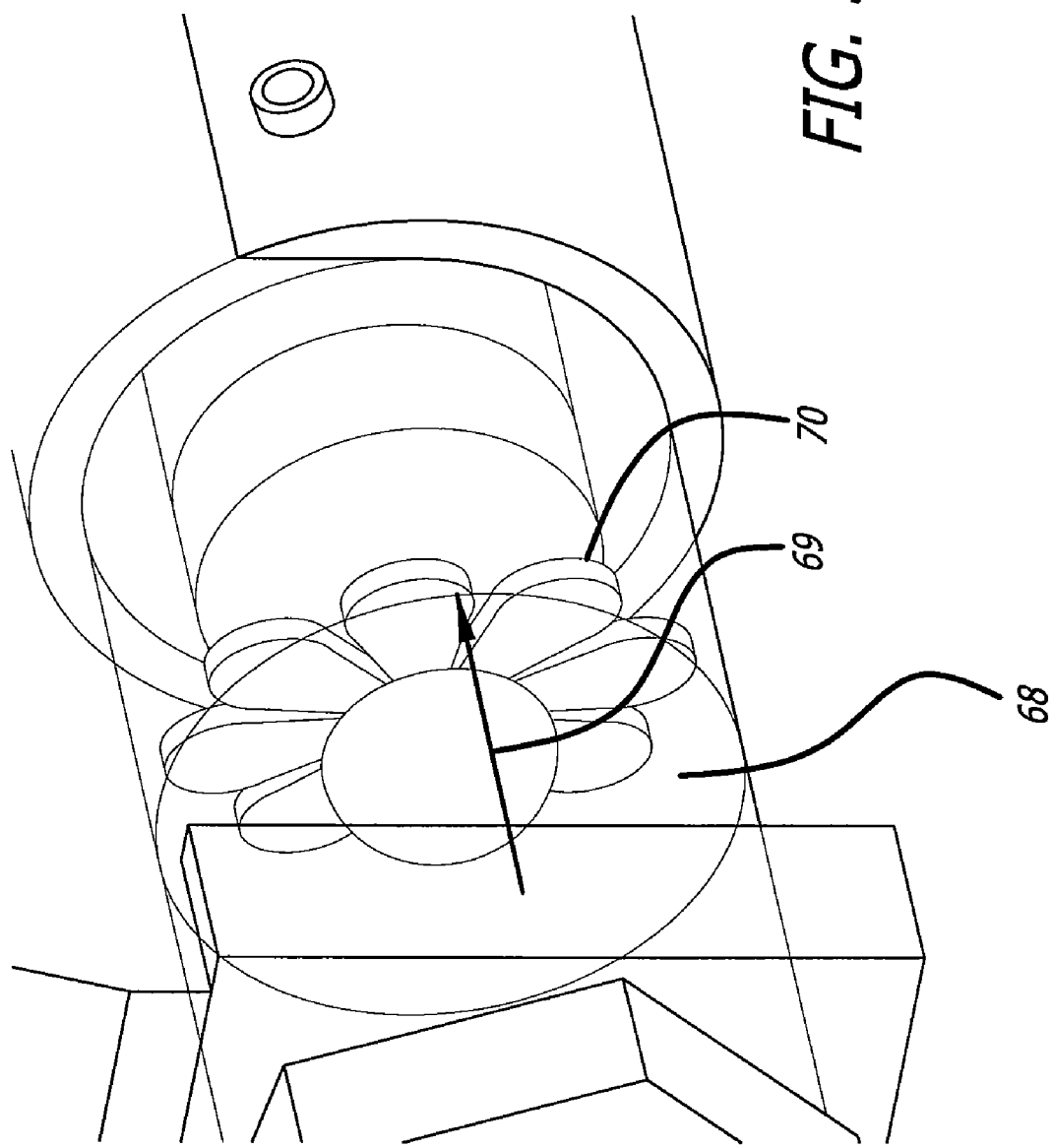
FIG. 5 is an enlarged perspective view of a portion of FIG. 4 showing details of the obstruction valve.

FIG. 5 is a close up view of the obstruction valve 68 of the flow meter depicted in FIGS. 3 and 4 showing the configuration and orientation of the petal valves 70. Flow is directed through multiple orifices 64 to create a pressure drop that is proportional to volumetric flow rate. The flexible petal valves seal the orifices at zero flow rate and gradually deflect to increase flow area as flow rate increase.

While a particular form of the invention has been illustrated and described, it will also be apparent to those skilled in the art that various modifications can be made without departing from the spirit and scope of the invention. Accordingly, it is not intended that the invention be limited except by the appended claims.

We claim:

1. A mass flow meter, comprising:
   a volumetric flow meter that includes an obstruction valve with an orifice covered by a deflectable petal that deflects as a function of fluid flow through said orifice to provide for increased flow area and thus capable of generating a signal proportional to the volumetric flow of a liquid through said flow meter, wherein a support structure is configured to fully support said entire petal as it becomes deflected to prevent damage thereto;
   a plurality of tubes concentrically arranged so as to share a common central axis through which said liquid flows, wherein capacitance across such tubes is measured to generate a signal proportional to the density of the liquid flowing through said flow meter; and
   a processor for computing a mass flow as a function of said volumetric flow signal and said density signal.

2. The mass flow meter of claim 1, further comprising a temperature sensor capable of generating a signal proportional to the temperature of said liquid for correction of mass flow computed by said processor.

3. The mass flow meter of claim 1, wherein said volumetric flow meter further comprises
   a sensor for measuring a pressure drop across said obstruction valve.

4. The mass flow meter of claim 1, further comprising a temperature sensor positioned in the liquid stream in said concentric tubes.

5. The mass flow meter of claim 4, wherein said temperature sensor comprises a low thermal mass temperature probe.

6. The mass flow meter of claim 1, wherein said volumetric flow meter comprises a plurality of deflectable petals.

7. The mass flow meter of claim 6, wherein said plurality of petals are arranged in a circular pattern.

8. The mass flow meter of claim 7, wherein said plurality of petals are arranged about a central axis that is aligned with said central axis of said concentric tubes.

9. The mass flow meter of claim 8, wherein said volumetric flow meter and said plurality of concentric tubes are disposed in a common housing.

\* \* \* \* \*